Nov. 1, 1966  E. R. LIGON  3,282,301
LINED PIPE CONSTRUCTION
Filed June 15, 1964  2 Sheets-Sheet 1
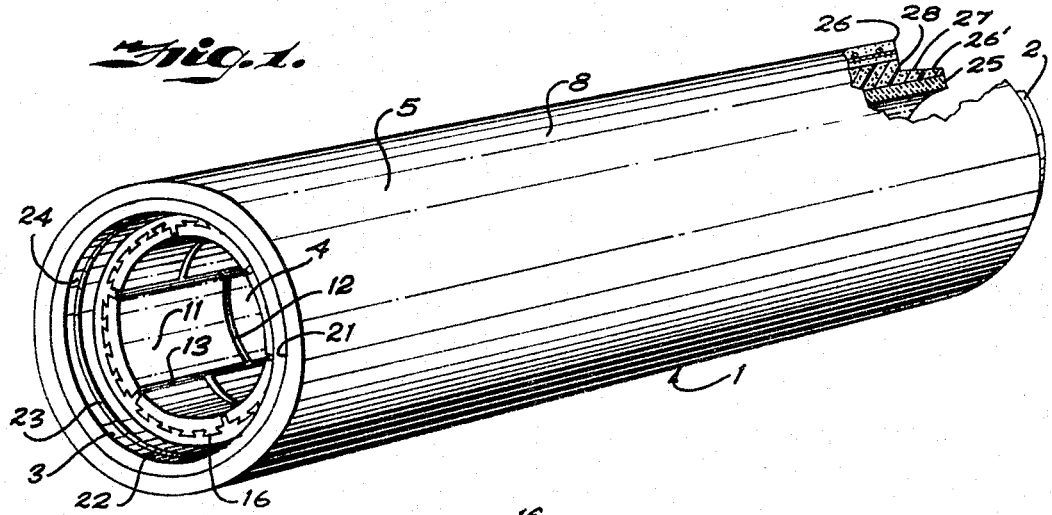
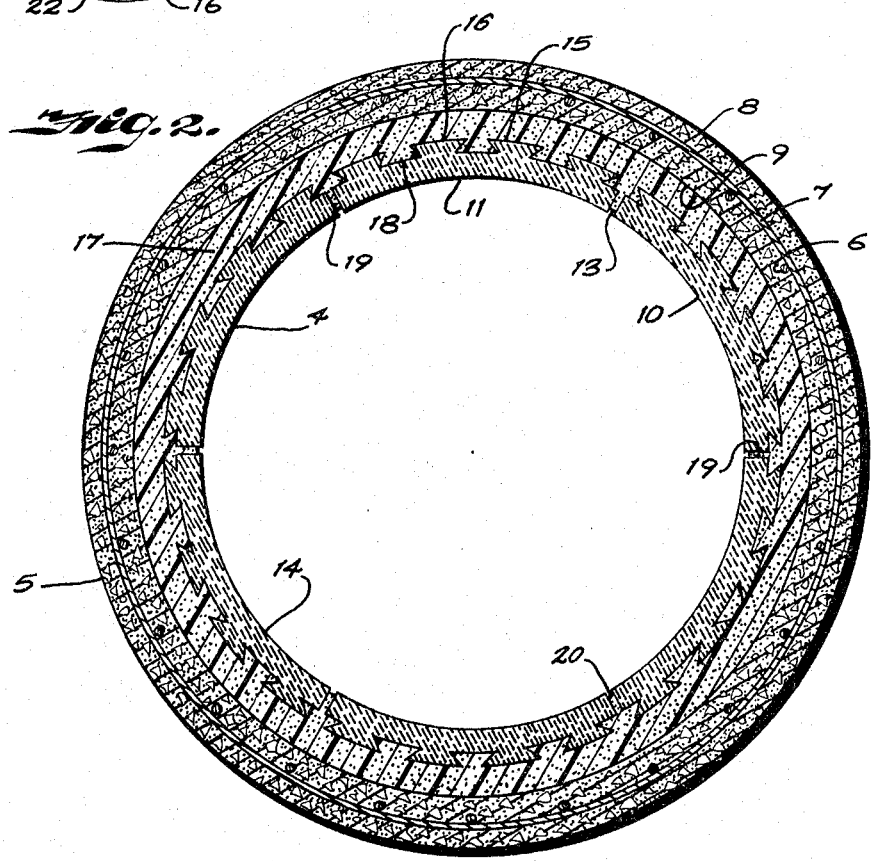
INVENTOR.
ELMER R. LIGON
BY
Fishburn and Gold
ATTORNEYS Nov. 1, 1966
E. R. LIGON
3,282,301
LINED PIPE CONSTRUCTION
Filed June 15, 1964
2 Sheets-Sheet 2
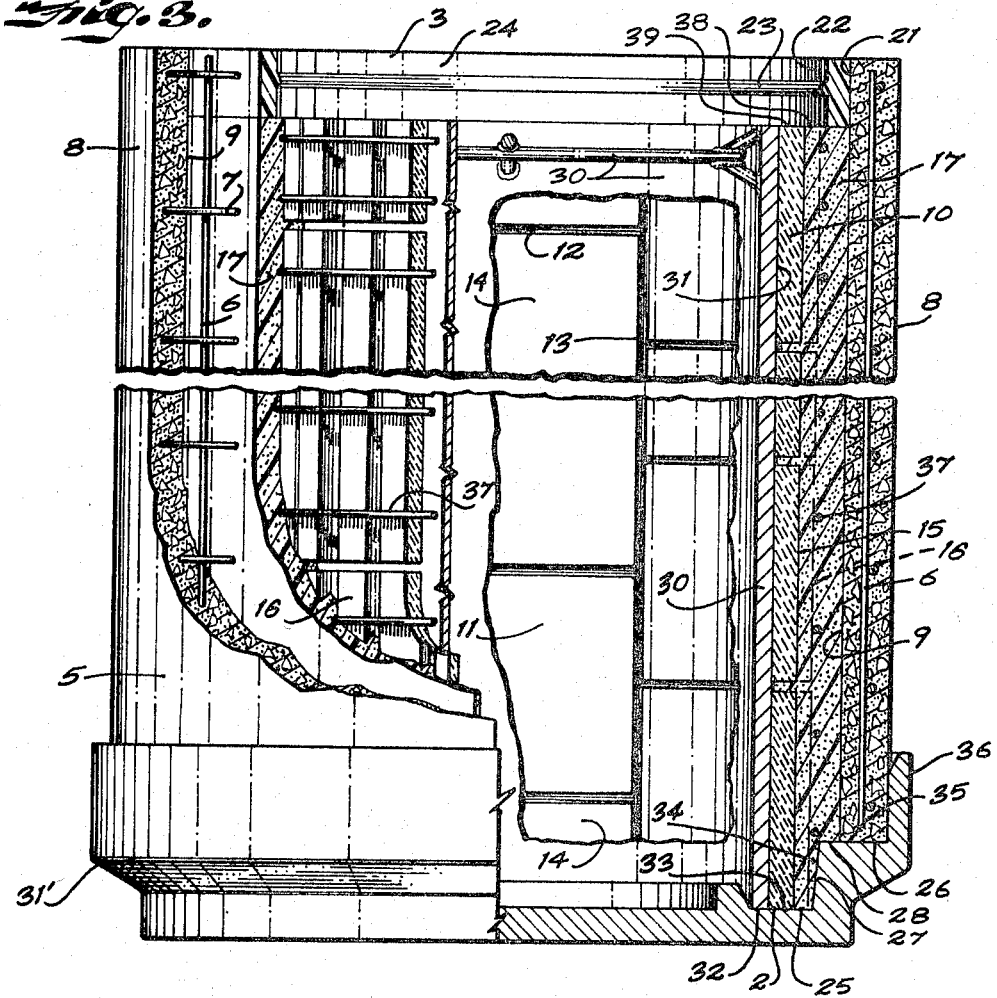
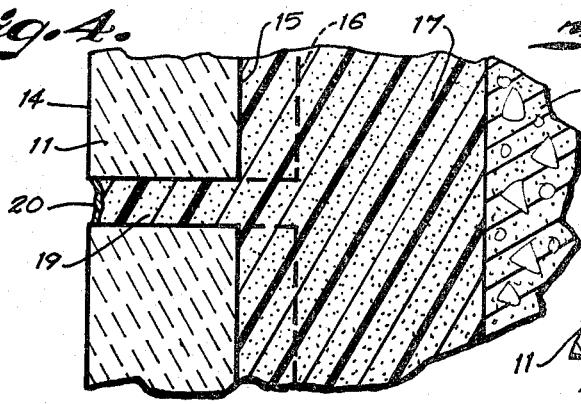
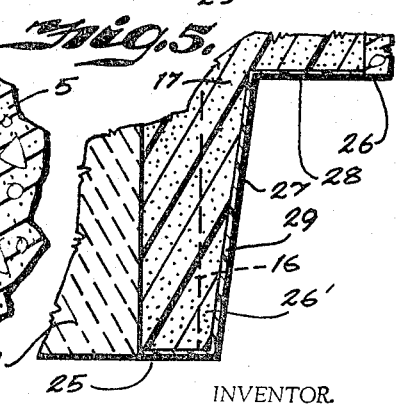
INVENTOR.
ELMER R. LIGON
BY
*Fishburn and Gold*
ATTORNEYS

United States Patent Office 3,282,301
Patented Nov. 1, 1966

3,282,301
LINED PIPE CONSTRUCTION
Elmer R. Ligon, Pittsburg, Kans., assignor to W. S. Dickey Clay Manufacturing Company, Kansas City, Mo., a corporation of Delaware
Filed June 15, 1964, Ser. No. 375,091
6 Claims. (Cl. 138—175)

This invention relates to pipe structures, and more particularly to relatively high strength large diameter pipe structures adapted for carrying sewage or other corrosive materials.

Concrete and particularly reinforced pre-stressed concrete possesses sufficient strength and satisfactory fabricating and cost characteristics to make desirable relatively high strength large diameter pipe for some applications; however, concrete is sensitive to a variety of corrosive materials such as many acids, alkalis, hydrogen sulphide gas, common solvents and waste products. It has heretofore been suggested to overcome this difficulty by securing resistant bricks or liner plates, such as of vitrified clay, on the inside surface of concrete pipe; however, difficulty has been experienced because of the corrosive materials weakening the securing material and causing the plates to fall off the arch of the sewer exposing the inner surface of the concrete to damage. Also, in the prior art lined pipe, differences in material expansion characteristics caused by set hydration and/or changes in temperature caused separation cracks exposing the concrete pipe. Mechanical and thermal shock have also been factors causing difficulty as well as high production costs.

The principal objects of the present invention are: to provide a lined pipe construction which overcomes the aforementioned difficulties; to provide a semi-rigid back-up material for securing the plates which is of sufficient thickness and resiliency to conform to dimensional variations caused by differences in expansion of the various materials in the pipe under changing temperature conditions; to provide such a structure which is highly resistant to conditions of mechanical and thermal shock; to provide a pipe structure having an outer cylindrical shell of pre-stressed reinforced concrete and an inner cylindrical shell spaced inwardly of the outer shell and formed of vitrified glazed clay liner plates and an intermediate bonding and protective shell of resilient or semi-rigid material of substantial thickness therebetween; to provide such a structure and method wherein the intermediate shell is formed of a foamed resin which is easily formed in place and produces a tough, hard, corrosive chemical resistant skin between spaced apart liner plates at the inside surface of the pipe structure and at the coupling ends; to provide such a structure wherein the liner plates have longitudinally extending outwardly directed dovetail portions receiving the intermediate foamed shell therebetween for securely binding the plates in position; to provide such a structure wherein the intermediate shell forms a semi-resilient, protective, integral cushion between the outer concrete pipe and inner liner as well as between the individual liner plates; to provide such a pipe structure which is easily fabricated in a great range of sizes and does not require the concrete to be cast in place around the liner; to provide such a pipe structure which is suitable for conveying liquids under pressure; and to provide such a pipe structure which is relatively light in weight without sacrificing strength, low in manufacturing and material costs and very well suited for its intended purpose.

Other objects and advantages of this invention will become apparent from the following description taken in connection with the accompanying drawings wherein are set forth by way of illustration and example certain embodiments of this invention.

FIG. 1 is a perspective view of a reinforced concrete vitrified clay-lined pipe section with a portion broken away to show the composite wall structure thereof.

FIG. 2 is a vertical cross-sectional view of the pipe structure on a larger scale showing the composite wall structure in greater detail.

FIG. 3 is a fragmentary elevational view on the scale of FIG. 2 showing a pipe section supported in a mold with an internal mandrel in place.

FIG. 4 is a fragmentary cross-sectional view on a further enlarged scale showing a typical joint or groove between liner plates with the intermediate foamed shell projecting therebetween and forming a tough skin at the interior surface of the pipe.

FIG. 5 is a fragmentary cross-sectional view on the scale of FIG. 4 showing the skin formed at a coupling end of the pipe section.

Referring to the drawings in more detail:

The reference numeral 1 generally indicates a cylindrical sewer pipe section embodying this invention. The sewer pipe section 1 has oppositely directed male and female coupling ends respectively designated 2 and 3 and an interior flow contacting surface 4. An outer cylindrical shell 5 is formed of concrete, in the illustrated example having longitudinal and transverse reinforcing rods respectively designated 6 and 7 embedded therein between the external surface 8 and the internal surface 9 thereof.

An inner cylindrical shell 10 is spaced radially inwardly of the outer shell 5 and includes circumferentially and longitudinally spaced apart vitrified clay liner plates 11 which are formed, preferably by extrusion, in circular segments so as to produce a cylindrical interior surface 4 in the sewer pipe section 1. The spacing of the liner plates 11 forms radially and longitudinally extending grooves therebetween respectively designated 12 and 13. The liner plates 11 each have an inwardly directed glazed flow surface 14 which, together, substantially comprise the interior surface 4. The liner plates 11 each have an outer surface 15 shaped to form a plurality of longitudinally extending outwardly directed dovetail portions 16.

The sewer pipe section 1 includes an intermediate integral shell 17 of resilient foamed resin located between and bonded to the liner plate outer surfaces 15 and the outer shell internal surface 9 and substantially filling the space therebetween. A suitable material for the intermediate shell has been found to be semi-rigid polyurethane foam having a density of about 8–10 pounds per cubic foot and which is applied as noted more fully below producing a closed cell structure of controlled rigidity. The intermediate shell 17 forms a cushioning back-up material between the outer shell 5 and inner shell 10 and protrudes at 18 between the dovetail portions 16 to securely retain the respective liner plates 11. The shell 17 also extends between the respective spaced apart liner plates into the longitudinal and radial grooves 12 and 13 at 19 substantially filling same to the interior surface 4. As discussed more fully below, the intermediate shell 17 forms a tough, chemical and abrasion-resistant skin 20 which connects the liner plates 11 at or immediately adjacent the respective flow surfaces 14, FIG. 4.

The semi-rigid polyurethane foam may be produced with the aid of suitable proportioning pumps and mixing heads (not shown). Toluene diisocyanate reacted with a branched polyol, such as a suitable polyether having closely spaced cross-linking sites and including a filler, blowing agent and catalyst has been used although other materials having similar characteristics may also be used such as foamed epoxy resins.

At the female end 3, the outer shell 5 forms a projection 21 which extends axially beyond the inner shell 10 and intermediate shell 17. A solid compression type coupling gasket 22 having a suitable inwardly projecting bead 23 is bonded to the outer shell internal surface 9 at the projection 21. The coupling gasket 22 is preferably formed by casting a solid urethane elastomer in place and adapts the structure for coupling to the male end of an adjacent sewer pipe section. The coupling gasket 22 has a wall thickness less than the thickness of the intermediate or resin shell 17 and forms an inwardly directed or inner sealing surface 24 from which the bead 23 protrudes inwardly.

At the male end 2, the inner shell 10 forms a projection 25 axially beyond the end 26 of the outer shell 5. The intermediate or resin shell 17 has a portion 26' projecting with the inner shell projection 25 beyond the outer shell end 26 to provide a cover for the outer surface of the projecting liner plates. The portion 26' of the shell 17 has an outer surface 27 which tapers outwardly from the male end 2 toward the female end 3. The tapering surface 27 terminates abruptly at the axial position of the outer shell end 26 where it extends radially outwardly forming an axially abuttable surface 28.

The tapering surface 27 and the abuttable surface 28 of the intermediate shell 17 have a tough abrasion-resistant skin 29 similar to the skin 20 for sealing engagement with the inner sealing surface 24 and bead 23 of the coupling gasket 22 on an adjacent pipe section.

The skins 20 and 29 are generally a few thousandths of an inch thick and are formed as a result of an interaction between silicone parting compounds used on the mold surfaces and the foaming polyurethane. The closed cell structure of the foamed intermediate shell will prevent the migration of corrosive chemicals or gases if a break should occur in the skin.

In forming the sewer pipe section 1, a cylindrical mandrel 30 of steel or like hard material having a smooth exterior surface 31 is rested on end within an end plate or end blocking mold 31'. The mold 31' receives the lower end 32 of the mandrel in a circular trough or groove 33, the outer wall 34 of which tapers upwardly and outwardly to a radially extending surface 35. The surface 35 is elevated above the bottom of the groove 33 a distance equal to the desired projection of the male end 2. An outer lip or flange 36 extends axially upwardly from the surface 35. The surface 31 of the mandrel, the bottom of the groove 33, the wall 34 and the elevated surface 35 are coated with a silicone grease parting compound which, as noted above, has the additional function of reacting with the foaming polyurethane shell 17 to form the skins 20 and 29. The vitrified clay liner plates 11 are bound securely by wires 37 to the mandrel 30 in spaced apart relation, as best illustrated in FIG. 3. The concrete outer shell 5 is then telescoped over the mandrel and liner plates, the inside diameter of the outer shell being such that sufficient space is left between the wires 37 and the outer shell 5 to permit the insertion of nozzles (not shown) thereinto from the top for depositing the mixed resin compound which subsequently foams and cures to form the intermediate shell 17. Approximately a ¾-inch separation between the outer shell and the liner plates has been found to be satisfactory. The rising of the foaming resin is matched with the withdrawal rate of the nozzles (not shown) and the radial grooves 12 and 13 are simultaneously filled with the space between the inner and outer shells. Any suitable back-up member (not shown) may be used for squaring off the upper end surface 38 of the intermediate shell 17 with the end 39 of the inner shell 10. The wires 37 remain within the intermediate shell 17 after formation and serve as auxiliary reinforcing lending additional interior hoop strength to the finished pipe section which is particularly desirable when used for carrying high pressures. The coupling gasket 22 may be molded in place while the section rests on the end plate or mold 31' or after stripping, as desired, by use of a well known molding procedure.

Following the stripping of the mold 31' and mandrel 30, the semi-rigid intermediate shell 17 securely retains the liner plates 11 and the interior surface 4 formed by the liner plates and the skin portions 20 therebetween provide a smooth abrasion, chemical, and mechanical shock resistant surface suitable for containing highly corrosive materials. Sudden variations in the temperature of materials within the pipe present no difficulty since the liner plates are permitted a great degree of individual expansion and contraction without placing high stress on the joints therebetween or the joint with the outer shell 5. Further, the foamed intermediate shell 17 acts as an excellent insulating layer for inhibiting heat transmission through the pipe section. Since the major portion of the intermediate shell 17 is the trapped gas forming the voids, a relatively small proportion of resin is required providing significant cost and weight advantages. The only limiting factor in the size of the sewer pipe section would appear to be the limits in availability of the concrete outer shell. Internal diameters of the inner cylindrical shell between 36 and 108 inches are clearly attainable.

Although certain examples of this invention have been illustrated and described, it is not to be limited to the specific form or arrangement of parts herein described and shown except insofar as such limitations are included in the claims.

What I claim and desire to secure by Letters Patent is:
1. A pipe structure comprising:
 (a) an outer shell of concrete having an external and an internal surface,
 (b) an inner cylindrical shell spaced radially inwardly of said outer shell and including spaced apart liner plates forming grooves therebetween, said liner plates each having an inwardly directed flow surface and an outer surface, and
 (c) an intermediate integral shell of resilient closed cell foamed resin located between and bonded to said liner plate outer surfaces and said outer shell internal surface and substantially filling the space therebetween, said resin shell protruding between said liner plates and substantially filling said grooves.

2. The pipe structure as set forth in claim 1 wherein:
 (a) said resin shell forms a tough resilient skin connecting said liner plates adjacent said inwardly directed flow surfaces.

3. The pipe structure as set forth in claim 1 wherein:
 (a) said liner plates form outwardly directed dovetail portions at said outer surfaces,
 (b) said resin protruding between said dovetail portions and securely anchoring said liner plates in position.

4. The pipe structure as set forth in claim 1 wherein:
 (a) said structure has oppositely directed male and female coupling ends, said outer shell forms a projection at said female end axially beyond said inner shell and intermediate shell, a coupling gasket is bonded to said outer shell internal surface at said outer shell projection, said coupling gasket has an inner sealing surface and a wall thickness less than the thickness of said intermediate shell,
 (b) said inner shell forms a projection at said male end axially beyond said outer shell, said intermediate shell partially projects with said inner shell and tapers outwardly toward said female end forming a tapering portion,
 (c) the tapering portion of said intermediate shell being sized for sealing engagement with the coupling gasket inner sealing surface of an adjacent pipe structure.

5. The pipe structure as set forth in claim 4 wherein:
 (a) said intermediate shell forms a tough resilient skin at said tapering portion.

6. A corrosive chemical resistant cylindrical sewer pipe structure comprising:
 (a) an outer cylindrical shell of pre-stressed reinforced concrete having longitudinal and transverse reinforcing rods embedded therein and having an external and an internal surface, (b) an inner cylindrical shell spaced radially inwardly of said outer shell and including circumferentially and longitudinally spaced apart vitrified clay liner plates forming radially and longitudinally extending grooves therebetween, said liner plates each having an inwardly directed flow surface, said liner plates each having an outer surface forming a plurality of longitudinally extending outwardly directed dovetail portions, and (c) an intermediate integral shell of resilient closed cell foamed resin located between and bonded to said liner plate outer surfaces and said outer shell internal surface and substantially filling the space therebetween, said resin shell protruding between said liner plates and substantially filling said grooves to said flow surfaces, said resin shell forming a tough resilient skin connecting said liner plates at said flow surfaces.

References Cited by the Examiner

UNITED STATES PATENTS

| | | | |
|---|---|---|---|
| 1,120,706 | 12/1914 | Flannery | 138—175 |
| 1,177,311 | 3/1916 | Flannery | 138—175 |
| 3,106,227 | 10/1963 | Crowley | 138—176 |

FOREIGN PATENTS 520,659    4/1940    Great Britain.

SAMUEL ROTHBERG, *Primary Examiner.*

H. K. ARTIS, *Examiner.*